United States Patent
Sohn et al.

(10) Patent No.: US 9,406,163 B2
(45) Date of Patent: Aug. 2, 2016

(54) VOLUME RENDERING APPARATUS AND METHOD OF OPERATING SAME

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Yu-mi Sohn, Seongnam-si (KR); Yeong-gil Shin, Seoul (KR); Dong-geon Oh, Incheon (KR); Ho-chul Kang, Seoul (KR); Ki-won Sohn, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 8 days.

(21) Appl. No.: 14/600,181

(22) Filed: Jan. 20, 2015

(65) Prior Publication Data
US 2015/0269768 A1   Sep. 24, 2015

(30) Foreign Application Priority Data
Mar. 24, 2014  (KR) .................. 10-2014-0034130

(51) Int. Cl.
*G06T 15/08*   (2011.01)
*G06T 15/06*   (2011.01)

(52) U.S. Cl.
CPC .............. *G06T 15/08* (2013.01); *G06T 15/06* (2013.01); *G06T 2210/41* (2013.01)

(58) Field of Classification Search
None
See application file for complete search history.

(56) References Cited

U.S. PATENT DOCUMENTS

| | | | | |
|---|---|---|---|---|
| 6,396,397 B1* | 5/2002 | Bos | ...................... | B60N 2/002 180/167 |
| 7,471,834 B2* | 12/2008 | Sull | ..................... | G11B 27/034 375/240 |
| 2003/0048838 A1* | 3/2003 | Sexton | ............. | H04L 25/03171 375/229 |
| 2004/0037564 A1* | 2/2004 | Halevi | .............. | H04B 10/2931 398/94 |
| 2005/0093861 A1* | 5/2005 | Moreau-Gobard | ..... | G06T 15/08 345/419 |
| 2006/0039468 A1* | 2/2006 | Emerson | ............... | G06F 3/1454 375/240.01 |
| 2006/0147106 A1* | 7/2006 | Yang | ...................... | G06T 15/08 382/154 |

FOREIGN PATENT DOCUMENTS

KR        10-1075014 B1    10/2011

* cited by examiner

*Primary Examiner* — Ashish K Thomas
(74) *Attorney, Agent, or Firm* — Sughrue Mion, PLLC (57) ABSTRACT

A method for medical imaging executed by an apparatus including a processor includes determining a start block of volume rendering based on respective maximum values of blocks positioned on a path of a light beam; acquiring a value of the light beam based on first sampling values acquired by sampling the start block; setting a processing order for remaining blocks positioned on the path of the light beam based on respective distances between the start block and the remaining blocks; determining whether a next block, according to the processing order, is to be processed, by comparing a maximum value of the next block with the value of the light beam; and comparing second sampling values acquired by sampling the next block with the value of the light beam and updating the value of the light beam according to a comparison result, in response to the maximum value of the next block being greater than the value of the light beam.

21 Claims, 10 Drawing Sheets

VOLUME RENDERING APPARATUS AND METHOD OF OPERATING SAME

CROSS-REFERENCE TO RELATED APPLICATION

This application claims priority from Korean Patent Application No. 10-2014-0034130, filed on Mar. 24, 2014, in the Korean Intellectual Property Office, the disclosure of which is incorporated herein in its entirety by reference.

BACKGROUND

1. Field

Apparatuses and methods consistent with exemplary embodiments relate to volume rendering, and more particularly, to volume rendering using a maximum intensity projection (MIP) scheme.

2. Description of the Related Art

A medical imaging system provides medical data as visual information for diagnosis by using various schemes. The medical data is obtained by reformatting, in a three-dimensional (3D) format, overlapping cross-sectional images of an object, e.g., a human organ, which are obtained by three-dimensional (3D) medical imaging devices, such as a computed tomography (CT) device, a magnetic resonance (MR) device, and the like.

Recently, along with the development of the technology of medical imaging devices, such as the CT device and the MR device, medical images may be acquired within a relatively short time. For example, in a hospital, several hundreds to thousands of images may be generated for each examination. However, while bulk image information provides useful diagnostic information, much time and efforts are required to read a plurality of images one by one in the related art method of reading two-dimensional (2D) images. To solve this problem, the 3D medical imaging system provides 3D medical imaging data as visual information useful for diagnosis by using various schemes.

Examples of 3D medical image visualization include a direct volume rendering (DVR) scheme, a maximum intensity projection (MIP) scheme, a multi-planar reformatting (MPR) scheme, and the like.

The MIP includes generating a 2D image by determining a pixel value based on a maximum value from among sample values of volume data located in a direction of a light beam passing through respective pixels along a gaze direction. The MIP scheme is easy to implement and is useful to visualize an object such as a bone, a blood vessel, or the like having a larger brightness value than a surrounding region. Therefore, the MIP scheme is widely used in various imaging fields, e.g., diagnosing vascular stenosis from an angiographic image, determining a bone fracture from a CT image, and/or detecting a structural defect of a metal injection molded product.

SUMMARY

One or more exemplary embodiments provide a volume rendering apparatus capable of improving volume rendering performance independently to a viewpoint direction when volume rendering using a maximum intensity projection (MIP) scheme is performed and a method of operating the same.

According to an aspect of an exemplary embodiment, a method of operating a volume rendering apparatus includes: determining a start block of volume rendering based on a maximum value of blocks existing on a path of a light beam; acquiring a value of the light beam based on first sampling values acquired by sampling the start block; setting a processing order of the other blocks based on distances between the start block and the other blocks; determining whether a next block is processed, by comparing a maximum value of the next block with the value of the light beam according to the set order; and comparing second sampling values acquired by sampling the next block with the value of the light beam and updating the value of the light beam according to the comparison result, if the maximum value of the next block is greater than the value of the light beam.

The light beam may pass through a pixel on a projection plane on which volume data is projected from a viewpoint, and the method may further include determining the finally updated value of the light beam as a value of the pixel.

The method may further include: grouping volume data for which the volume rendering is to be performed into a plurality of blocks; and calculating a maximum value of each of the plurality of blocks.

The acquiring of the value of the light beam may include setting a maximum value of the first sampling values as an initial value of the light beam by comparing the first sampling values with each other.

The setting of the processing order of the other blocks may include setting the processing order of the other blocks in an order close to the start block.

The next block may be arranged in a first direction getting close to the viewpoint or in a second direction getting far from the viewpoint based on a current block.

The determining of whether the next block is processed may include not sampling the next block if the value of the light beam is greater than or equal to the maximum value of the next block and sampling the next block if the light beam is less than the maximum value of the next block.

The updating of the value of the light beam may include updating the value of the light beam as each of the second sampling values if the value of the light beam is less than each of the second sampling values.

Each of the blocks may include a plurality of sub-blocks, and the acquiring of the value of the light beam may include: selecting a sub-block having a maximum value from among the plurality of sub-blocks included in the start block; and acquiring the value of the light beam based on third sampling values acquired by sampling the selected sub-block.

Each of the blocks may include a plurality of sub-blocks, and the updating of the value of the light beam may include: selecting a sub-block having a maximum value from among the plurality of sub-blocks included in the next block if the maximum value of the next block is greater than the value of the light beam; and updating the value of the light beam based on the fourth sampling values acquired by sampling the selected sub-block.

According to an aspect of an exemplary embodiment, a volume rendering apparatus includes: a block controller for determining a start block of volume rendering based on a maximum value of blocks existing on a path of a light beam; a sampler for acquiring first sampling values by sampling the start block; and a light beam value determinator for determining one of the first sampling values as a value of the light beam, wherein the block controller sets a processing order of the other blocks based on distances between the start block and the other blocks and determines whether a next block is processed, by comparing a maximum value of the next block with the value of the light beam according to the set order, the sampler acquires second sampling values by sampling the next block if the maximum value of the next block is greater than the value of the light beam, and the light beam value determinator updates the value of the light beam by comparing the second sampling values with the value of the light beam.

The light beam may pass through a pixel on a projection plane on which volume data is projected from a viewpoint, and the volume rendering apparatus may further include a pixel value extractor for extracting the finally updated value of the light beam as a value of the pixel.

The block controller may group volume data for which the volume rendering is to be performed into a plurality of blocks and calculate a maximum value of each of the plurality of blocks, and the volume rendering apparatus may further include a storage unit for storing the calculated maximum value of each of the plurality of blocks.

The light beam value determinator may set a maximum value of the first sampling values as an initial value of the light beam by comparing the first sampling values with each other.

The block controller may set the processing order of the other blocks in an order close to the start block.

The next block may be arranged in a first direction getting close to the viewpoint or in a second direction getting far from the viewpoint based on a current block.

The block controller may control so as not to sample the next block if the value of the light beam is greater than or equal to the maximum value of the next block and control so as to sample the next block if the light beam is less than the maximum value of the next block.

The light beam value determinator may update the value of the light beam as each of the second sampling value if the value of the light beam is less than each of the second sampling value.

Each of the blocks may include a plurality of sub-blocks, the block controller may select a sub-block having a maximum value from among the plurality of sub-blocks included in the start block, the sampler may acquire third sampling values acquired by sampling the selected sub-block, and the light beam value determinator may acquire the value of the light beam based on the third sampling values.

Each of the blocks may include a plurality of sub-blocks, the block controller may select a sub-block having a maximum value from among the plurality of sub-blocks included in the next block if the maximum value of the next block is greater than the value of the light beam, the sampler may acquire fourth sampling values acquired by sampling the selected sub-block, and the light beam value determinator may update the value of the light beam based on the fourth sampling values.

BRIEF DESCRIPTION OF THE DRAWINGS

The above and/or other aspects will become more apparent by describing certain exemplary embodiments with reference to the accompanying drawings, in which.

DETAILED DESCRIPTION

In the specification, when a certain part "includes" a certain component, this indicates that the part may further include another component instead of excluding another component unless there is different disclosure. In addition, the term, such as "... unit" or "... module," disclosed in the specification indicates a unit for processing at least one function or operation, and this may be implemented by hardware, software, or a combination thereof.

Certain exemplary embodiments are described in greater detail below with reference to the accompanying drawings, wherein like reference numerals refer to like elements throughout. In this regard, the exemplary embodiments may have different forms and should not be construed as being limited to the descriptions set forth herein. As used herein, the term "and/or" includes any and all combinations of one or more of the associated listed items. Expressions such as "at least one of," when preceding a list of elements, modify the entire list of elements and do not modify the individual elements of the list.

Figure 1:
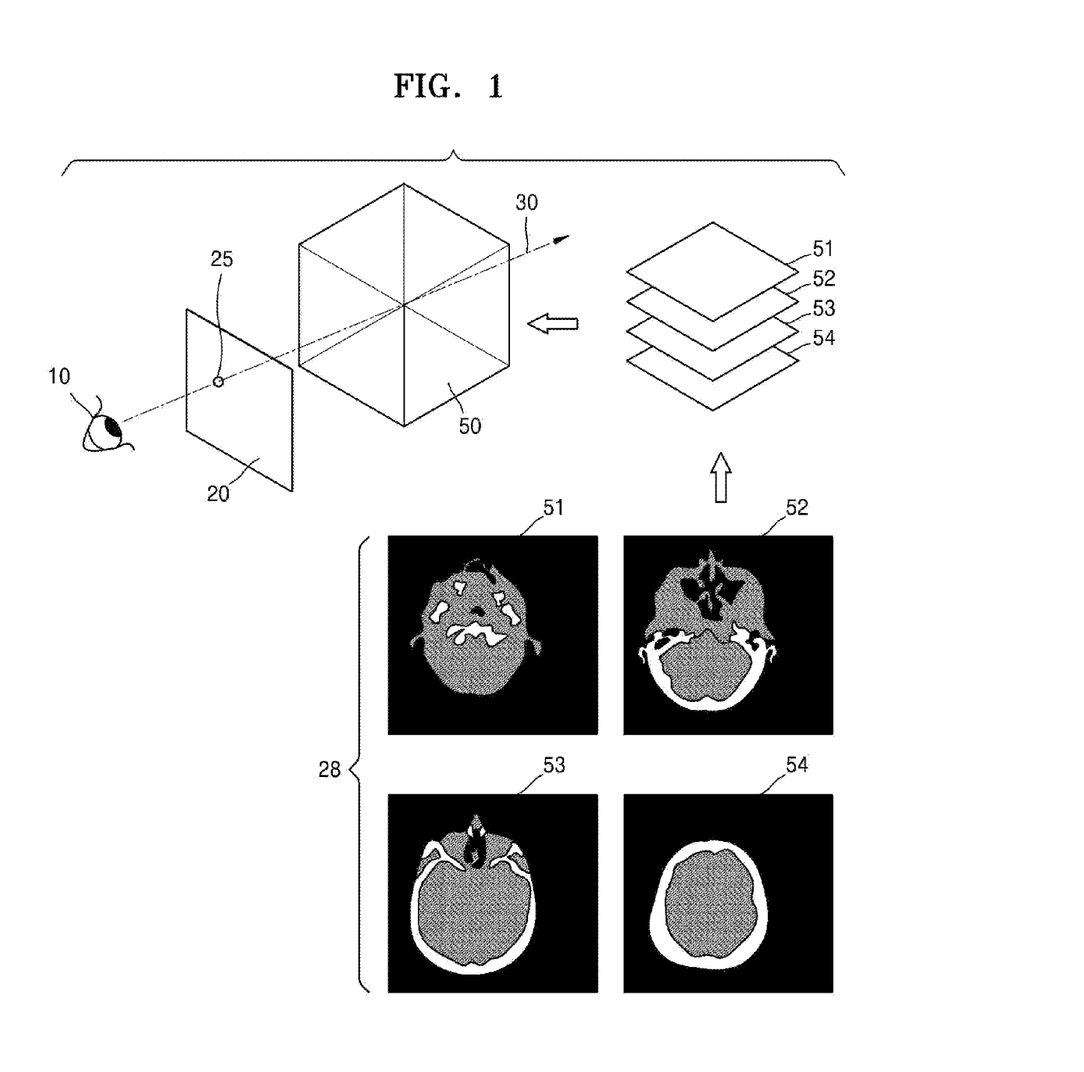
FIG. 1 illustrates a volume rendering method according to a maximum intensity projection (MIP) scheme according to an exemplary embodiment.

FIG. 1 illustrates a volume rendering method according to a maximum intensity projection (MIP) scheme according to an exemplary embodiment.

Three-dimensional (3D) medical image rendering may be achieved based on a model including a viewpoint, a gaze direction, a screen, and volume data (or a volume of an object).

As shown in FIG. 1, in rendering a 3D medical image, a volume rendering apparatus (100, refer to FIG. 2) may determine a viewpoint 10 and determine a screen 20 based on the determined viewpoint 10. In this case, the viewpoint 10 indicates a direction in which a viewer views 3D (volume) data 50. In addition, the screen 20 indicates a projection plane on which the volume data 50 is projected from the viewpoint 10, that is, a two-dimensional (2D) screen on which an image generated by performing volume rendering by the volume rendering apparatus 100 is displayed.

The volume rendering apparatus 100 may pass a light beam 30 from the viewpoint 10 to each pixel on the screen 20 after determining the viewpoint 10 and the screen 20. In this case, the light beam 30 indicates a projection line which connects the viewpoint 10 and one pixel 25 on the screen 20 and is projected on the volume data 50.

The volume data 50 is data indicating a volume of the object occupied in a 3D space. For example, the volume data 50 may indicate data obtained by accumulating cross-sectional images 28, e.g., 2D tomographic images 51, 52, 53, 54, etc., of the object (e.g., a human tissue) captured by using a medical imaging device, such as a magnetic resonance imaging (MRI) or computed tomography (CT) device, and reformatting the accumulated cross-sectional images 51, 52, 53, and 54 in a 3D form.

The volume rendering apparatus 100 according to an exemplary embodiment performs volume rendering by an MIP scheme. Referring to FIG. 1, the MIP scheme is a scheme of generating an image of the 3D volume data 50 of an object projected on the 2D screen 20 by sampling, at a certain sampling interval, the volume data 50 in a space through which the light beam 30 from a pixel 25 passes and setting a maximum density value of sampling values acquired according to the sampling result as a value of the pixel 25 on the screen 20.

Figure 2:
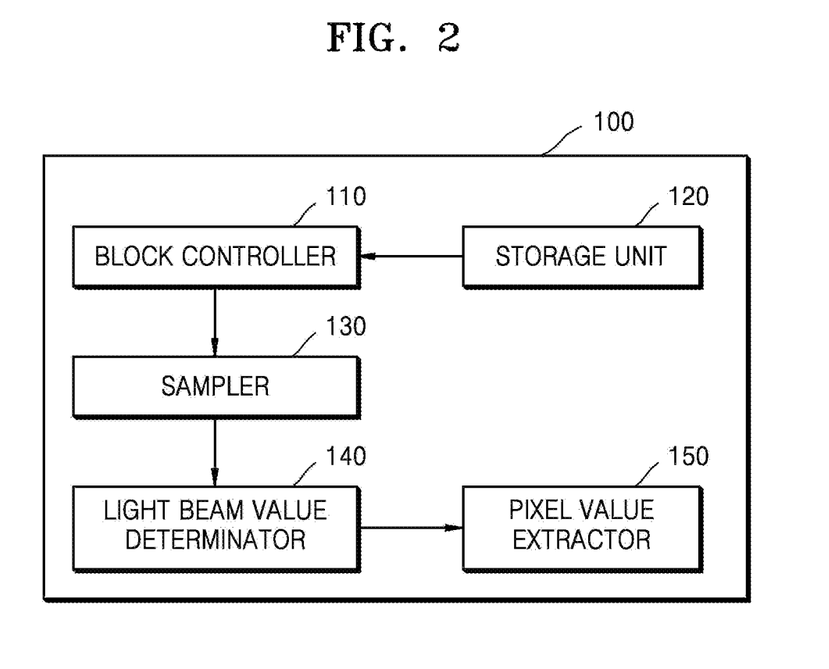
FIG. 2 is a block diagram of a volume rendering apparatus according to an exemplary embodiment.

FIG. 2 is a block diagram of the volume rendering apparatus 100 according to an exemplary embodiment.

Referring to FIG. 2, the volume rendering apparatus 100 according to an exemplary embodiment may include a block controller 110, a storage unit 120, a sampler 130, a light beam value determinator 140, and a pixel value extractor 150.

The block controller 110 may group or divide volume data into a plurality of blocks. In this case, each of the plurality of blocks may be formed in a 3D block form including one voxel, corresponding to a pixel in a volume as a unit having a density value in the volume data, and neighboring voxels of the one voxel. In addition, sizes of the plurality of blocks may different from each other, and accordingly, the number of voxels included in each block may vary. In addition, each of the plurality of blocks may include a plurality of sub-blocks.

The block controller 110 may calculate maximum values of brightness of the plurality of blocks in advance, respectively, and store the calculated maximum values of brightness for each of the plurality of blocks in the storage unit 120 to be described below. In this case, the block controller 110 may compare a plurality of voxel values included in one block with each other and determine the maximum voxel value as a maximum value of the corresponding block.

The block controller 110 may extract blocks positioned on a path of a light beam (i.e., blocks through which the light beam passes) when the light beam is determined according to a viewpoint and a pixel on a screen, compare maximum values of the extracted blocks with each other, and determine a block having the greatest maximum value as a start block of volume rendering.

The block controller 110 may set an order of processing other blocks based on distances between the start block and the other blocks and determine whether a next block is processed according to the set order. In this case, the block controller 110 may compare a maximum value of the next block with a value of the light beam, and if the maximum value of the next block is greater than the value of the light beam, the block controller 110 may control to process the next block. Otherwise, if the maximum value of the next block is less than or equal to the value of the light beam, the block controller 110 may control not to process the next block. In an exemplary embodiment, the controller 110 may be a processor.

The sampler 130 may acquire sampling values (e.g., first sampling values) by sampling the start block determined by the block controller 110 and acquire sampling values (e.g., second sampling values) by sampling the next block to be processed.

The sampler 130 may sample a straight line along which the light beam passes in a sampling block, at a preset sampling interval, and acquire sampling values from sampling points. In this case, the sampler 130 may determine the sampling points based on a direction vector of a traveling direction of the light beam within volume data corresponding to the sampling block, an entry point of the light beam into the sampling block, and the sampling interval, and may acquire the sampling values from the determined sampling points. In addition, the sampler 130 may acquire the sampling values by performing various interpolations based on voxel values included in the sampling block.

The light beam value determinator 140 may determine a maximum value of the sampling values (e.g., the first sampling values) of the start block as an initial value of the light beam 30. In addition, the light beam value determinator 140 may update the value of the light beam 30 by comparing the sampling values (e.g., the second sampling values) of the next block to be processed with the value of the light beam. For example, when a sampling value among the second sampling values of the next block is greater than the value of the light beam, the light beam value determinator 140 may update the value of the light beam to the corresponding sampling value, and when a sampling value among the second sampling values of the next block is less than or equal to the value of the light beam, the light beam value determinator 140 may maintain the value of the light beam without updating.

The pixel value extractor 150 may extract a value of the light beam finally updated by the light beam value determinator 140 as a pixel value of the pixel on the screen when all of the blocks existing on the path of the light beam are processed.

The storage unit 120 may be implemented by various types of storage media, such as a flash memory, a hard disk, an electrically erasable programmable read-only memory (EEPROM), and/or the like. In addition, the volume rendering apparatus 100 may operate a web storage or a cloud server functioning as the storage unit 120 in a web. In addition, the storage unit 120 may store the maximum value of each of the plurality of blocks, which is calculated by the block controller 110 as described above.

Figure 3:
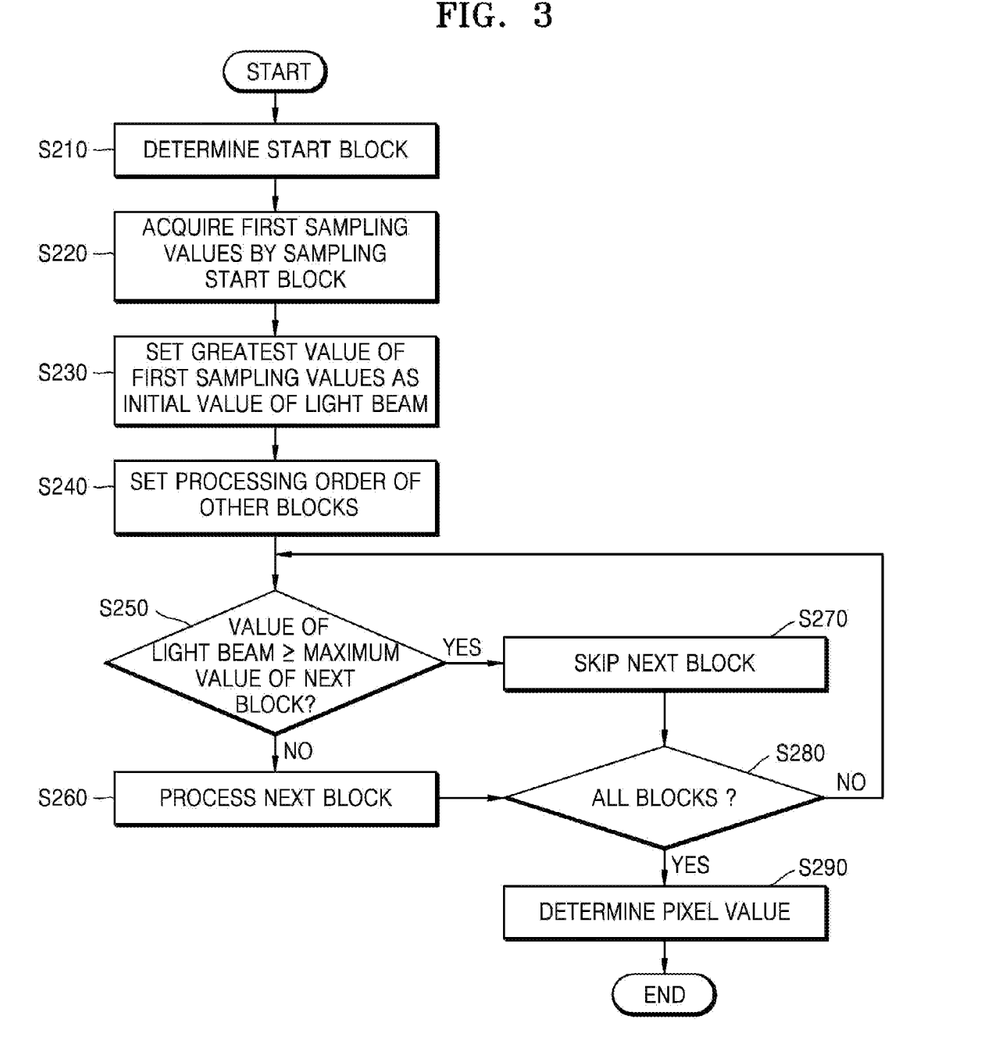
FIGS. 3 and 4 are flowcharts of a method of operating a volume rendering apparatus, according to an exemplary embodiment.
Figure 4:
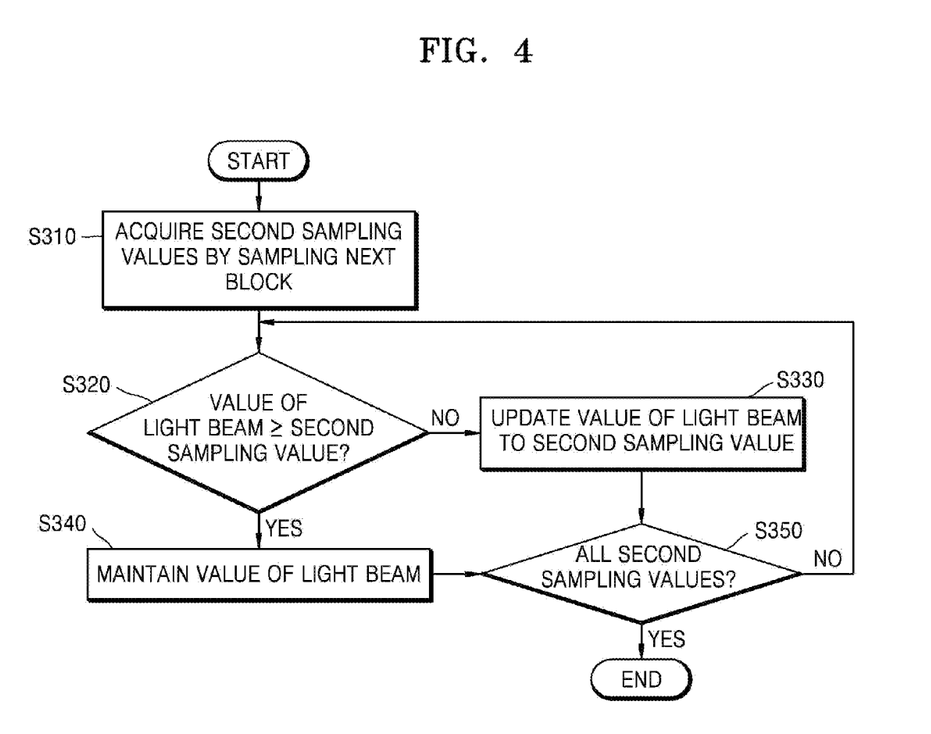

FIGS. 3 and 4 are flowcharts of a method of operating the volume rendering apparatus 100, according to an exemplary embodiment.

Referring to FIG. 3, the volume rendering apparatus 100 determines a start block of rendering in operation S210.

The volume rendering apparatus 100 may group volume data into a plurality of blocks. In this case, each of the plurality of blocks may be formed in a 3D block form including one voxel, corresponding to a pixel in a volume as a unit having a density value in the volume data, and neighboring voxels of the one voxel. In addition, sizes of the plurality of blocks may be different from each other, and accordingly, the number of voxels included in each block may vary. In addition, each of the plurality of blocks may include a plurality of sub-blocks.

In addition, the volume rendering apparatus 100 may calculate maximum values of the plurality of blocks in advance, respectively, and store the calculated maximum values. In this case, a maximum value may indicate the greatest value in volume data included in one block and may be the greatest one of voxel values included in the one block.

For example, the volume rendering apparatus 100 may group the volume data into a first block, a second block, and a third block, and when each of the first, second, and third blocks includes eight voxels, the volume rendering apparatus 100 may compare eight voxel values included in the first block with each other and store the greatest voxel value as a maximum value of the first block. Likewise, the volume rendering apparatus 100 may store respective maximum values of the second and third blocks.

The volume rendering apparatus 100 may extract blocks through which a light beam passes when the light beam is determined according to a viewpoint and a pixel on a 2D screen on which the volume data is projected. The volume rendering apparatus 100 may compare maximum values of the extracted blocks with each other and determine a block having the greatest maximum value as the start block of volume rendering.

Figure 5:
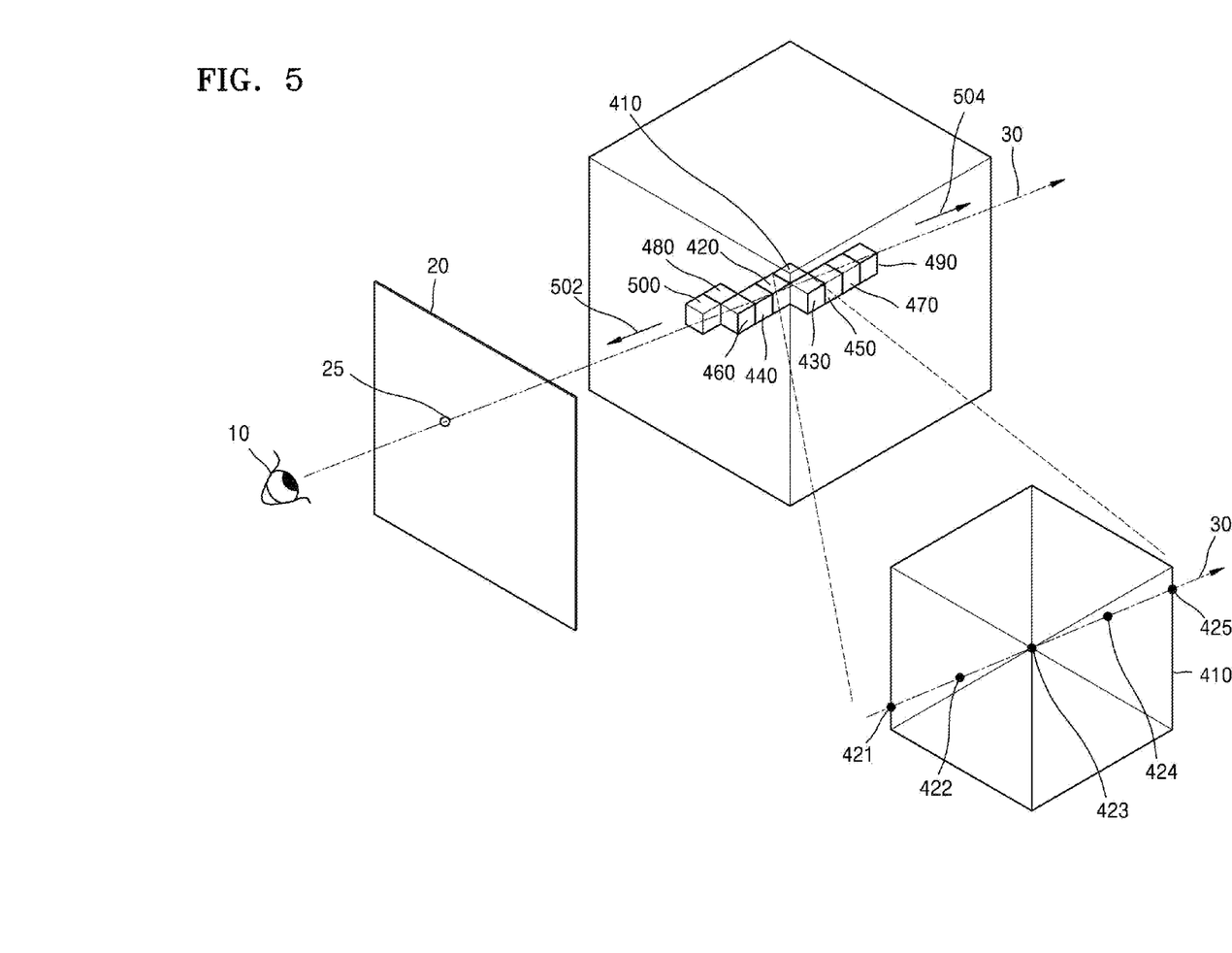
FIG. 5 illustrates a method of determining a start block and an initial value of a light beam, according to an exemplary embodiment.

For example, referring to FIG. 5, the volume rendering apparatus 100 passes the light beam 30 in a direction from the viewpoint 10 to the pixel 25 on the screen 20. In this case, the volume rendering apparatus 100 may extract a plurality of blocks, e.g., a first block 410, a second block 420, a third block 430, a fourth block 440, a fifth block 450, a sixth block 460, a seventh block 470, an eighth block 480, a ninth block 490, and a tenth block 500, through which the light beam 30 passes and compare maximum values of the extracted blocks with each other. As a result of the comparison, if a maximum value of the first block 410 is the greatest, the volume rendering apparatus 100 may determine the first block 410 as a start block of volume rendering.

When a start point of volume rendering is determined according to a direction of the viewpoint 10, a rendering speed and performance of the volume rendering apparatus 100 may vary according to the direction of the viewpoint 10. However, the volume rendering apparatus 100 according to an exemplary embodiment may determine a start point of volume rendering by using maximum values of blocks and perform volume rendering based on the determined start point, thereby exhibiting a rendering speed and performance independent to a direction of a viewpoint 10.

In operation S220, the volume rendering apparatus 100 acquires sampling values (e.g., first sampling values) by sampling the start block.

For example, referring to FIG. 5, the light beam 30 may be sampled from the first block 410 determined as the start block at a preset sampling interval, and sampling values at sampling points 421, 422, 423, 424, and 425 of the first block 410 may be acquired. In this case, the volume rendering apparatus 100 may determine the sampling points 421, 422, 423, 424, and 425 based on a direction vector of a traveling direction of the light beam 30 within volume data corresponding to the first block 410, an entry point of the light beam 30 into the first block 410, and the sampling interval, and may acquire the sampling values at the determined sampling points 421, 422, 423, 424, and 425. In this case, the sampling values may be interpolated values based on voxel values included in the first block 410.

In operation S230, the volume rendering apparatus 100 sets the greatest one of the sampling values as an initial value of the light beam.

For example, as shown in FIG. 5, the volume rendering apparatus 100 may compare the sampling values at the sampling points 421, 422, 423, 424, 425, which are acquired from the first block 410, with each other and set the greatest sampling value as an initial value of the light beam 30.

When the start block is determined, the volume rendering apparatus 100 sets an order of processing the other blocks based on distances between the start block and the other blocks in operation S240.

Figure 6:
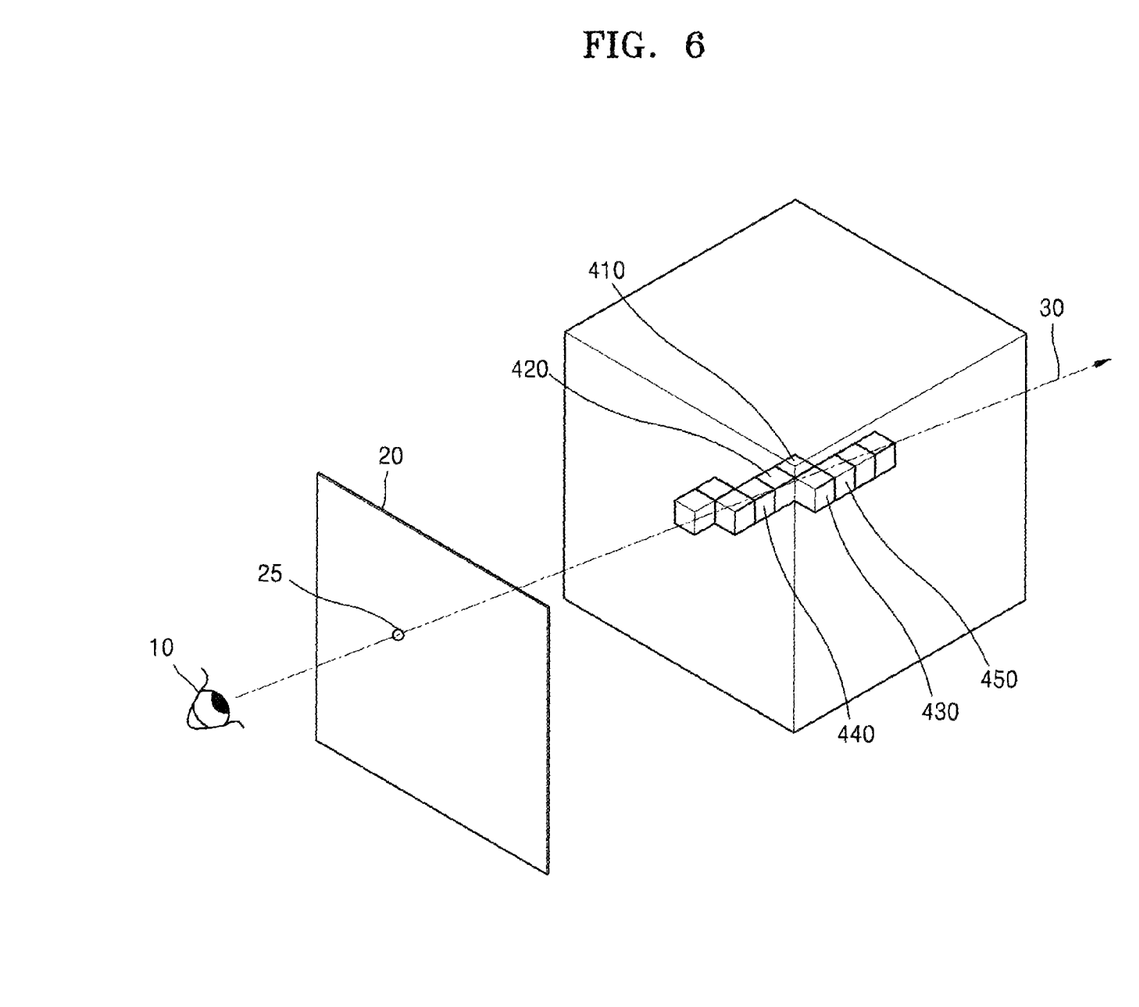
FIG. 6 illustrates a method of determining a processing order of other blocks, according to an exemplary embodiment.

In this case, the order of processing the other blocks may be determined based on a distance from the start block, and when the start block is determined, the volume rendering apparatus 100 may calculate a distance between the start block and each of the blocks through which the light beam passes and determine the order so as to first process a block closer to the start block than the blocks further away from the start block. Accordingly, a next block may be arranged in a first direction 502 toward the viewpoint 10 relative to the start block 410 or in a second direction 504 opposite to the first direction (i.e., in a direction away from the viewpoint 10 relative to the first block 410).

For example, as shown in FIG. 6, when the second block 420, the third block 430, the fourth block 440, and the fifth block 450 are disposed depending on distance from the first block 410 in this order, the volume rendering apparatus 100 may determine a block processing order in the order of the first block 410, the second block 420, the third block 430, the fourth block 440, and the fifth block 450.

In this example, the second block 420 may be arranged in the first direction toward the viewpoint 10 relative to the first block 410, the third block 430 may be arranged in the second direction opposite to the first direction (i.e., in a direction away from the viewpoint 10 relative to the second block 420), the fourth block 440 may be arranged in the first direction closer to the viewpoint 10 relative to the third block 430, and the fifth block 450 may be arranged in the second direction further away from the viewpoint 10 relative to the fourth block 440. Although the processing order for only the first to fifth blocks 410 to 450 has been described with reference to FIG. 6, the processing order for the remaining blocks, i.e., sixth to tenth blocks 460 to 500 may be determined in a similar manner. It should be noted that exemplary embodiments are not limited thereto and a block processing order may be determined such that the third block 430 arranged in the second direction away from the viewpoint 10 relative to the start block 410 is processed subsequent to the start block 410, and so on.

As described above, the volume rendering apparatus 100 according to an exemplary embodiment may first search for neighboring blocks of a start block along first and second directions of a light beam, thereby improving the rendering performance and speed of medical images having a high spatial correlation, in which similar data are crowded in a certain region.

In operation S250, the volume rendering apparatus 100 determines whether a next block according to the set processing order is to be processed.

When the initial value of the light beam is set from the start block, the volume rendering apparatus 100 may compare a maximum value of a next block according to the block processing order with the initial value of the light beam and determine whether the next block is processed or skipped without processing based on a result of the comparison.

If the value of the light beam is greater than or equal to a maximum value of the next block, the volume rendering apparatus 100 skips processing of the next block in operation s270 and determines whether all of the blocks are processed in operation S280. For example, as a result of comparing the initial value of the light beam set from the start block (e.g., the first block 410) with a maximum value of the second block 420 that is the next block, if the initial value of the light beam is greater than or equal to the maximum value of the second block 420, the volume rendering apparatus 100 may skip processing of the second block 420 and determine whether all of the blocks are processed in operation s280. If not all of the blocks are processed, the volume rendering apparatus 100 may move to operation S250 to perform the above described operation with respect to the third block 430 that is a next block after the second block 420.

Otherwise, if the value of the light beam is less than the maximum value of the next block, the volume rendering apparatus 100 processes the next block in operation S260. For example, as a result of comparing the initial value of the light beam set from the start block (e.g., the first block 410) with the maximum value of the second block 420 that is the next block, if the initial value of the light beam is less than the maximum value of the second block 420, the volume rendering apparatus 100 may process the second block 420.

As described above, according to an exemplary embodiment, by determining whether a block is processed by using a maximum value of the block, when the maximum value of the block is less than a value of a light beam, the block may be skipped without processing, thereby reducing corresponding rendering computation. Accordingly, a rendering speed may be improved.

When a block size for volume rendering is smaller, a computational amount for sampling a start block to determine an initial value of a light beam may be reduced, and processing of a next block may be efficiently skipped, thereby improving a rendering performance and speed. However, when a block size for volume rendering is excessively small, a computational amount for computing maximum values of all blocks and the like may increase, thereby decreasing the rendering performance and speed. Therefore, the volume rendering apparatus 100 may set a proper block size in consideration of the conditions above according to exemplary embodiments.

The block processing will now be described in detail with reference to FIGS. 4 and 7.

Referring to FIG. 4, in operation S310, the volume rendering apparatus 100 acquires sampling values (e.g., second sampling values) by sampling a next block to be processed.

Figure 7:
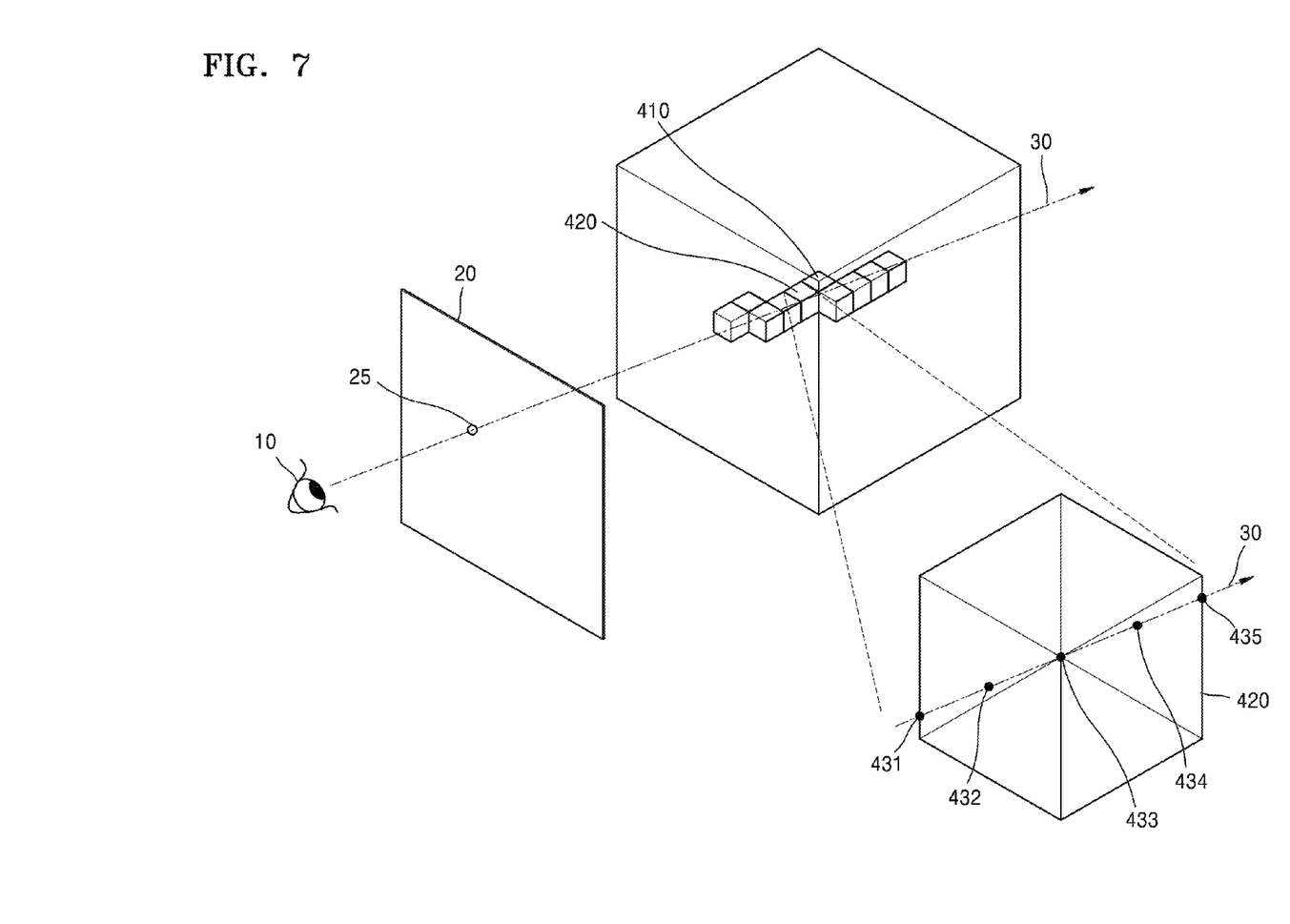
FIG. 7 illustrates a method of processing a block, according to an exemplary embodiment.

For example, referring to FIG. 7, second sampling values respectively obtained at first to fifth sampling points 431, 432, 433, 434, and 435 may be acquired by sampling the light beam 30 passing through the second block 420 at the preset sampling interval. In this case, the volume rendering apparatus 100 may determine the first to fifth sampling points 431, 432, 433, 434, and 435 based on a direction vector of a traveling direction of the light beam 30 within volume data corresponding to the second block 420, an entry point of the light beam 30 into the second block 420, the sampling interval, and the like, and may acquire the second sampling values at the determined sampling points 431, 432, 433, 434, and 435. In this case, the second sampling values may be interpolated values based on voxel values included in the second block 420.

In operation S320, the volume rendering apparatus 100 compares the second sampling values with a value of the light beam and determine whether the value of the light beam is greater than or equal to the second sampling values.

If the value of the light beam is greater than or equal to the second sampling values, the volume rendering apparatus 100 maintains the value of the light beam in operation S340. Otherwise, if the value of the light beam is less than at least one of the second sampling values, the volume rendering apparatus 100 updates the value of the light beam to a second sampling value that is greater than the value of the light beam in operation S330.

For example, when the second sampling values respectively corresponding to the first to fifth sampling points 431, 432, 433, 434, and 435 are acquired from the second block 420, the volume rendering apparatus 100 may compare the second sampling value of the first sampling point 431 with the value of the light beam 30 and maintain the value of the light beam 30 without updating if the value of the light beam 30 is greater than or equal to the second sampling value.

Otherwise, if the value of the light beam 30 is less than the second sampling value according to the comparison result, the volume rendering apparatus 100 may update the value of the light beam 30 to the second sampling value of the first sampling point 431.

Next, the volume rendering apparatus 100 determines whether all of the second sampling values are compared with the value of the light beam 30 in operation 350 and, when not all of the second sampling values are compared with the value of the light beam 30, the volume rendering apparatus 100 proceeds to operation S320. In this manner, the volume rendering apparatus 100 maintains or updates the value of the light beam 30 by comparing the value of the light beam 30 with each of the second sampling values.

Alternatively, the volume rendering apparatus 100 may compare second sampling values acquired from a sampling block (e.g., the second block 420) with each other, extract a maximum second sampling value from the second sampling values, and maintain or update the value of the light beam based on the extracted maximum second sampling value.

For example, the volume rendering apparatus 100 may extract a maximum second sampling value that is the greatest among the second sampling values acquired from the second block 420 and compare the extracted second maximum sampling value with the value of the light beam 30. The volume rendering apparatus 100 may maintain the value of the light beam 30 when the value of the light beam 30 is greater than or equal to the extracted maximum second sampling value and may update the value of the light beam 30 to the extracted maximum second sampling value when the value of the light beam 30 is less than the extracted maximum second sampling value.

In operation S290, the volume rendering apparatus 100 extracts a finally acquired value of the light beam 30 as a pixel value by repeating operations S250 to S280 for all of the blocks through which the light beam 30 passes.

The volume rendering apparatus 100 may generate a 2D image for which volume rendering of volume data has been performed by repeating operations S210 to S290 for all of the pixels.

Figure 8:
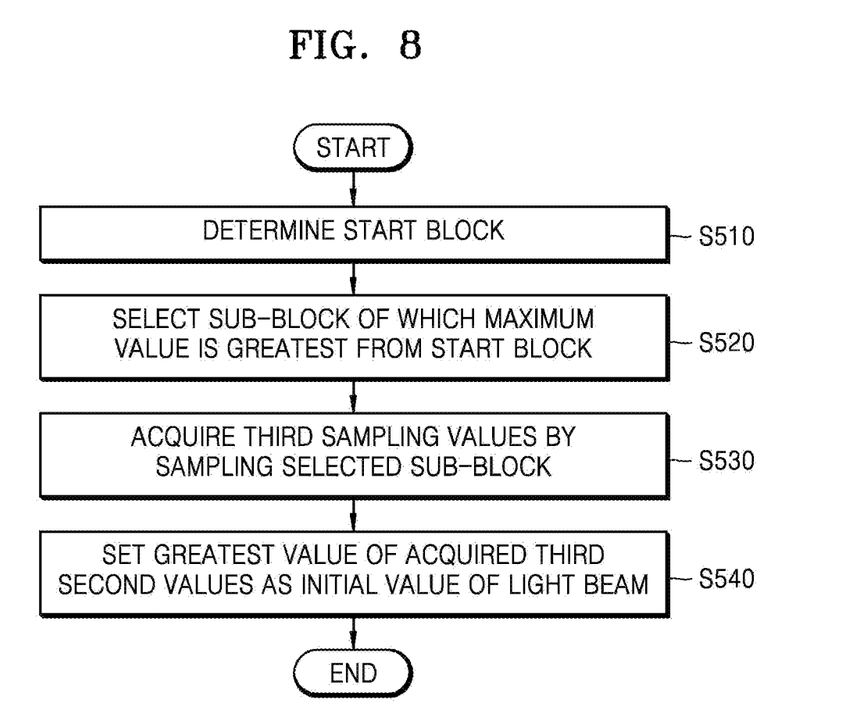
FIGS. 8 and 9 are flowcharts of a method of operating a volume rendering apparatus, according to another exemplary embodiment.
Figure 9:
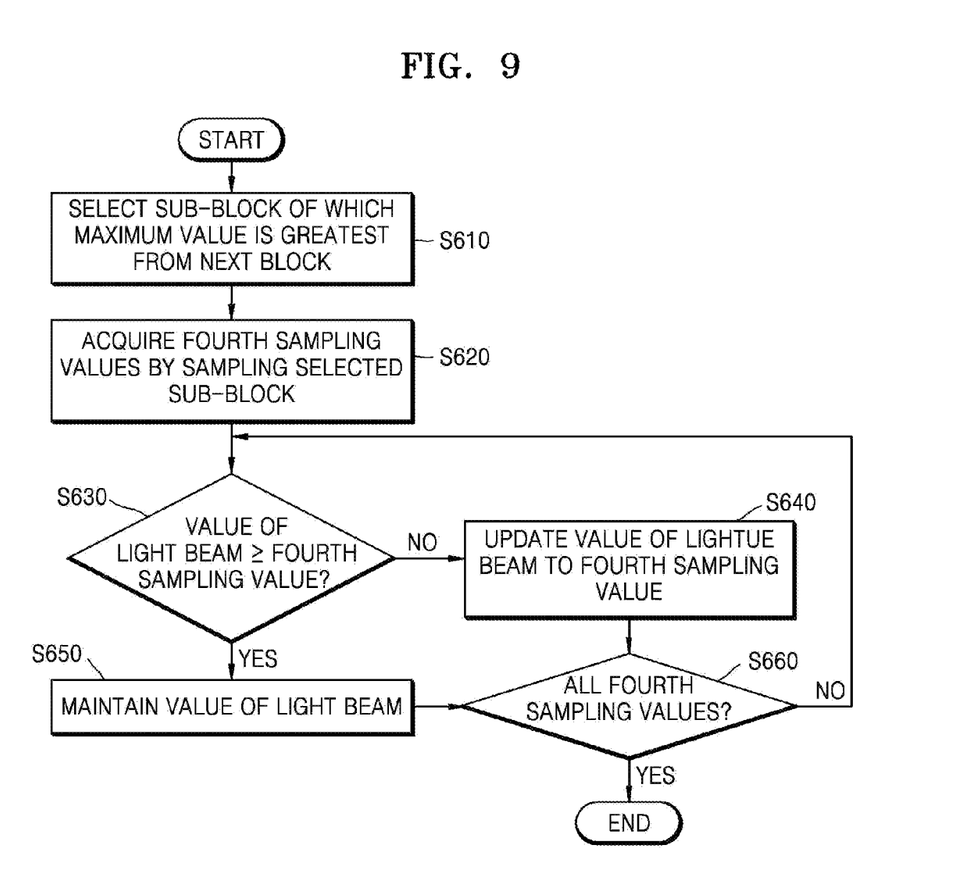
Figure 10:
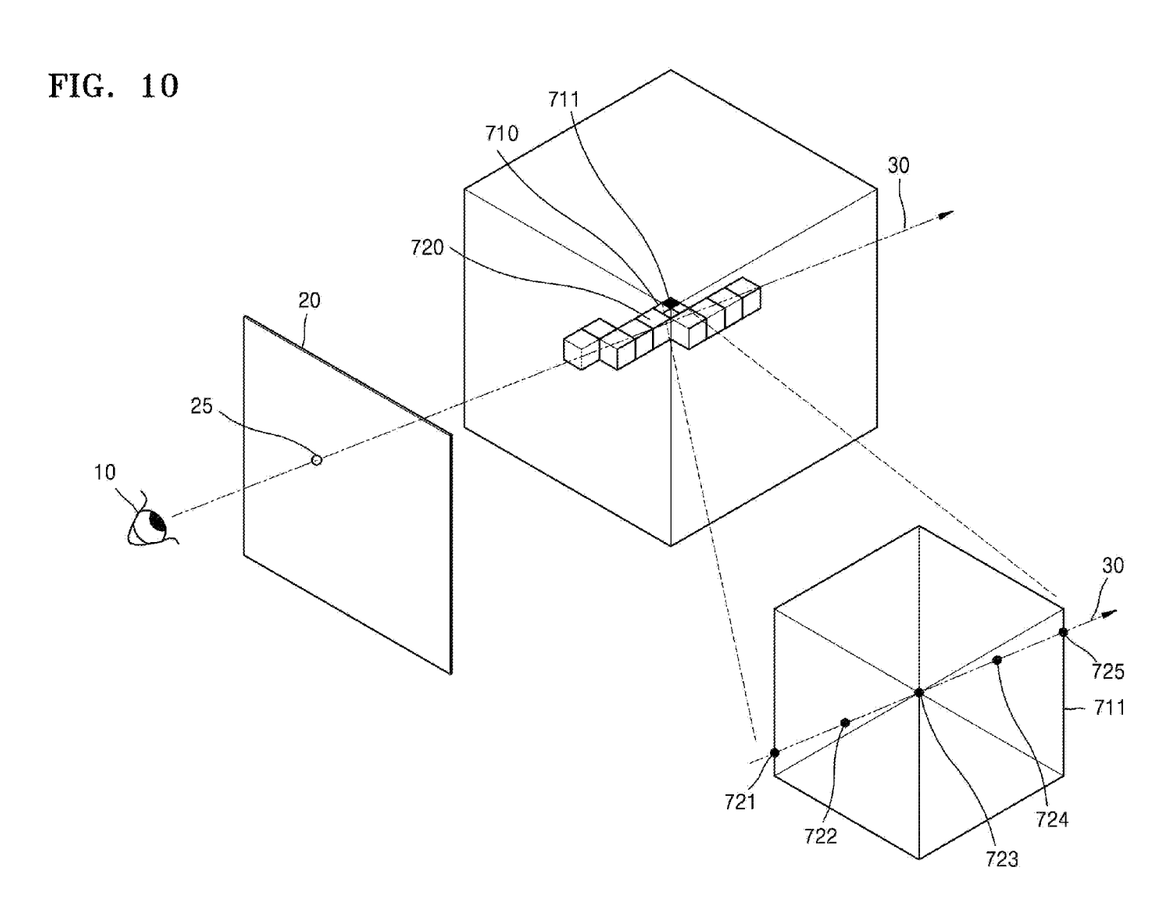
FIG. 10 illustrates a method of processing a block, according to another exemplary embodiment.

FIGS. 8 and 9 are flowcharts of a method of operating the volume rendering apparatus 100, according to another exemplary embodiment, and FIG. 10 illustrates a method of processing a block, according to another exemplary embodiment.

Referring to FIG. 8, in operation S510, the volume rendering apparatus 100 determines a start block for volume rendering.

The volume rendering apparatus 100 may divide one block into a plurality of sub-blocks. Each sub-block may include at least one voxel, and the number of sub-blocks and sizes of the sub-blocks included in one block may be variously modified according to exemplary embodiments.

For example, referring to FIG. 10, one block may include eight sub-blocks, i.e., a first to an eighth sub-blocks.

The volume rendering apparatus 100 may calculate and store a maximum value of a first block 710, a maximum value of a first sub-block 711, a maximum value of a second sub-block, a maximum value of a third sub-block, a maximum value of a fourth sub-block, a maximum value of a fifth sub-block, a maximum value of a sixth sub-block, a maximum value of a seventh sub-block, and a maximum value of an eighth sub-block. For example, the volume rendering apparatus 100 may compare voxel values included in the first sub-block 711 with each other and store the greatest voxel value as a maximum value of the first sub-block 711. Likewise, the volume rendering apparatus 100 may calculate and store a maximum value for each of the second to eighth sub-blocks of the first block 710. In addition, the volume rendering apparatus 100 may store the greatest value among the maximum values of the first to eighth sub-blocks as the maximum value of the first block 710.

In addition, the volume rendering apparatus 100 may also calculate and store a maximum value of each of the other blocks included in volume data and maximum values of all sub-blocks included in each of the other blocks in a similar manner as described above.

The volume rendering apparatus 100 may extract blocks through which the light beam 30 passes. The volume rendering apparatus 100 may compare maximum values of the extracted blocks with each other and determine a block having the greatest maximum value as the start block.

For example, when first to tenth blocks are extracted as blocks through which the light beam 30 passes and the maximum value of the first block 710 is the greatest among maximum values of the extracted first to tenth blocks, the volume rendering apparatus 100 may determine the first block 710 as a start block of volume rendering.

In operation S520, the volume rendering apparatus 100 selects a sub-block of which a maximum value is the greatest from among maximum values of sub-blocks included in the start block.

For example, the volume rendering apparatus 100 may compare the maximum values of the first to eighth sub-blocks included in the first block 710 with each other and select a sub-block having the greatest maximum value. In other words, the volume rendering apparatus 100 may select a sub block of which a maximum value is the maximum value of the first block 710.

In operation S530, the volume rendering apparatus 100 acquires sampling values (e.g., third sampling values) by sampling the selected sub-block.

For example, when the selected sub-block is the first sub-block 711, the light beam 30 may be sampled from the first sub-block 711 at the preset sampling interval, and sampling values at sampling points 721, 722, 723, 724, and 725 of the first sub-block 711 may be acquired. The volume rendering apparatus 100 may determine the sampling points 721, 722, 723, 724, and 725 based on a direction vector of a traveling direction of the light beam 30 within volume data corresponding to the first sub-block 711, an entry point of the light beam 30 into the first sub-block 711, and the sampling interval, and may acquire the sampling values at the determined sampling points 721, 722, 723, 724, and 725. The sampling values may be interpolated values based on voxel values included in the first sub-block 711.

As described above, when sampling is performed in sub-block units, a computation amount may be reduced than when sampling is performed in block units.

In operation S540, the volume rendering apparatus 100 sets the greatest value among the acquired third sampling values of the sub-block as an initial value of the light beam.

For example, as shown in FIG. 10, the volume rendering apparatus 100 may compare the sampling values corresponding to the sampling points 721, 722, 723, 724, and 725, which are acquired from the first sub-block 711, with each other and set the greatest sampling value as an initial value of the light beam 30.

Although not shown in FIG. 8, the volume rendering apparatus 100 may perform operations similar to S240 and S250 of FIG. 3. That is, when the initial value of the light beam 30 is determined, the volume rendering apparatus 100 may set a processing order of the other blocks, compare a maximum value of a next block with the value of the light beam 30, and determine whether the next block is processed or skipped without processing based on a result of the comparison. These operations have been described in detail with reference to FIG. 3, and thus the same description thereof is omitted.

Referring to FIG. 9, in operation S610, the volume rendering apparatus 100 selects a sub-block of which a maximum value is the greatest from among sub-blocks included in a next block when the next block is processed (i.e., when a maximum value of the next block is greater than a value of a light beam 30).

For example, referring to FIG. 10, when a maximum value of a second block 720 that is a next block is greater than the value of the light beam 30, the volume rendering apparatus 100 may compare maximum values of sub-blocks included in the second block 720 with each other and select a sub-block of which a maximum value is the greatest. In other words, the volume rendering apparatus 100 may select a sub-block of the second block 720 of which a maximum value is the maximum value of the second block 720.

In operation S620, the volume rendering apparatus 100 acquires sampling values (e.g., fourth sampling values) by sampling the selected sub-block.

For example, the light beam 30 may be sampled from the selected sub-block at the preset sampling interval, and sampling values at sampling points of the selected sub-block may be acquired. In this case, the volume rendering apparatus 100 may determine the sampling points based on a direction vector of a traveling direction of the light beam 30 within volume data corresponding to the selected sub-block, an entry point of the light beam 30 into the selected sub-block, the sampling interval, and the like, and may acquire the sampling values at the determined sampling points. In this case, the sampling values may be interpolated values based on voxel values included in the selected sub-block.

In operation S630, the volume rendering apparatus 100 compares the sampling values with the value of the light beam 30 and determines whether the value of the light beam 30 is greater than or equal to the sampling values.

If the value of the light beam 30 is greater than or equal to the sampling values, the volume rendering apparatus 100 maintains the value of the light beam 30 in operation S650. Otherwise, if the value of the light beam 30 is less than at least one from the fourth sampling values, the volume rendering apparatus 100 updates the value of the light beam 30 to a sampling value that is greater than the value of the light beam 30 in operation S640.

Operations S630 to S660 correspond to operations S320 to S350, respectively, and thus, the same description thereof is omitted.

As described above, the volume rendering apparatus 100 may determine a finally acquired value of a light beam 30 as a pixel value for volume rendering after determining whether all blocks through the light beam 30 passes are processed or skipped without processing and performing processing according to the determination.

As described above, according to the exemplary embodiments, by determining a start point of volume rendering and performing volume rendering from the determined start point, volume rendering speed and performance independent to a viewpoint direction may be achieved.

In addition, by determining whether a block is processed by using a maximum value of the block, when a maximum value of the block is less than a value of a light beam, processing of the block may be skipped, thereby reducing corresponding volume rendering computation.

In addition, by searching for neighboring blocks of a start block along a travel direction of a light beam and the opposite direction thereof, the volume rendering performance and speed of medical images having a high spatial correlation, in which similar data are crowded in a certain region, may be improved.

The volume rendering apparatus and the method of operating the same, according to one or more exemplary embodiments, may be embodied as a computer-readable code on a computer-readable recording medium. The computer-readable recording medium is any data storage device that can store data that can thereafter be read by a computer system. Examples of the computer-readable recording medium include a read-only memory (ROM), a random-access memory (RAM), a compact disk (CD)-ROM, a magnetic tape, an optical data storage device, and storage media such as carrier waves (e.g., transmission through the Internet). The computer-readable recording medium can also be distributed over a network coupled computer system so that the computer-readable code is stored and executed in a distributed fashion.

In addition, other exemplary embodiments can also be implemented through computer-readable code and/or instructions in and/or on a medium, e.g., a computer-readable medium, to control at least one processing element to implement any of the above described exemplary embodiments. The medium can correspond to any medium and/or media permitting the storage and/or transmission of the computer-readable code.

The computer-readable code can be recorded and/or transferred on a medium in a variety of ways, with examples of the medium including recording media, such as magnetic storage media (e.g., ROM), floppy disks, hard disks, etc.) and optical recording media (e.g., CD-ROMs, or digital versatile disks (DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer-readable code is stored and/or transferred and executed in a distributed fashion. Furthermore, the processing element can include a processor or a computer processor, and processing elements may be distributed and/or included in a single device.

The foregoing exemplary embodiments and advantages are merely exemplary and are not to be construed as limiting. The present teaching can be readily applied to other types of apparatuses. The description of the exemplary embodiments is intended to be illustrative, and not to limit the scope of the claims, and many alternatives, modifications, and variations will be apparent to those skilled in the art.

What is claimed is:

1. A method for medical imaging executed by an apparatus comprising a processor, the method comprising:
   determining a start block of volume rendering based on respective maximum values of blocks positioned on a path of a light beam;
   acquiring a value of the light beam based on first sampling values acquired by sampling the start block;
   setting a processing order for remaining blocks positioned on the path of the light beam based on respective distances between the start block and the remaining blocks;
   determining whether a next block is to be processed, by comparing a maximum value of the next block with the value of the light beam, according to the set processing order; and
   comparing second sampling values acquired by sampling the next block with the value of the light beam and updating the value of the light beam according to a comparison result, in response to the maximum value of the next block being greater than the value of the light beam.

2. The method of claim 1, wherein the light beam passes through a pixel on a projection plane on which volume data is projected from a viewpoint, and
   the method further comprises determining a finally updated value of the light beam as a value of the pixel.

3. The method of claim 1, wherein the blocks are pieces into which volume data for which the volume rendering is to be performed is divided, and the method comprises:
   calculating the respective maximum values of the blocks.

4. The method of claim 1, wherein the acquiring the value of the light beam comprises setting a maximum value of the first sampling values as an initial value of the light beam by comparing the first sampling values with each other.

5. The method of claim 1, wherein the setting of the processing order for the remaining blocks comprises setting a higher processing order to a block of the remaining blocks that is positioned closer to the start block.

6. The method of claim 1, wherein the next block is arranged in a first direction toward the viewpoint relative to a current block or in a second direction opposite to the first direction.

7. The method of claim 1, wherein the determining whether the next block is to be processed comprises omitting sampling the next block in response to the value of the light beam being greater than or equal to the maximum value of the next block.

8. The method of claim 1, wherein the updating the value of the light beam comprises updating the value of the light beam to a greatest second sampling value in response to the value of the light beam being less than the greatest second sampling value.

9. The method of claim 1, wherein each of the blocks comprises sub-blocks, and
   the acquiring the value of the light beam comprises:
   selecting a sub-block having a maximum value from the sub-blocks included in the start block; and
   acquiring the value of the light beam based on third sampling values acquired by sampling the selected sub-block.

10. The method of claim 1, wherein each of the blocks comprises sub-blocks, and
    the updating the value of the light beam comprises:
    selecting a sub-block having a maximum value from the sub-blocks included in the next block in response to the maximum value of the next block being greater than the value of the light beam; and
    updating the value of the light beam based on fourth sampling values acquired by sampling the selected sub-block.

11. A volume rendering apparatus comprising:
    a block controller configured to determine a start block of volume rendering based on respective maximum values of blocks positioned on a path of a light beam;
    a sampler configured to acquire first sampling values by sampling the start block; and
    a light beam value determinator configured to determine a value of the light beam based on the first sampling values,
    wherein the block controller is configured to set a processing order for remaining blocks positioned on the path of the light beam based on respective distances between the start block and the remaining blocks and determine whether a next block is to be processed, by comparing a maximum value of the next block with the value of the light beam according to the set processing order,
    the sampler is configured to acquire second sampling values by sampling the next block in response to the maximum value of the next block being greater than the value of the light beam, and
    the light beam value determinator is configured to update the value of the light beam by comparing the second sampling values with the value of the light beam.

12. The volume rendering apparatus of claim 11, wherein the light beam passes through a pixel on a projection plane on which volume data is projected from a viewpoint, and the volume rendering apparatus further comprises a pixel value extractor configured to extract a finally updated value of the light beam as a value of the pixel.

13. The volume rendering apparatus of claim 11, wherein the block controller is configured to divide volume data for which the volume rendering is to be performed into the blocks and calculate the respective maximum values of the blocks, and the volume rendering apparatus further comprises a storage unit configured to store the calculated maximum values of the blocks.

14. The volume rendering apparatus of claim 11, wherein the light beam value determinator configured to set a maximum value of the first sampling values as an initial value of the light beam by comparing the first sampling values with each other.

15. The volume rendering apparatus of claim 11, wherein the block controller is configured to set a higher processing order to a block of the remaining blocks that is positioned closer to the start block.

16. The volume rendering apparatus of claim 11, wherein the next block is arranged in a first direction toward the viewpoint relative to a current block or in a second direction opposite to the first direction.

17. The volume rendering apparatus of claim 11, wherein the block controller is configured to control so as not to sample the next block in response to the value of the light beam being greater than or equal to the maximum value of the next block and control so as to sample the next block in response to the value of the light beam being less than the maximum value of the next block.

18. The volume rendering apparatus of claim 11, wherein the light beam value determinator is configured to update the value of the light beam to a greatest second sampling value in response to the value of the light beam being less than the greatest second sampling value.

19. The volume rendering apparatus of claim 11, wherein each of the blocks comprises sub-blocks, the block controller is configured to select a sub-block having a maximum value from the sub-blocks included in the start block, the sampler is configured to acquire third sampling values acquired by sampling the selected sub-block, and the light beam value determinator configured to update the value of the light beam based on the third sampling values.

20. The volume rendering apparatus of claim 11, wherein each of the blocks comprises sub-blocks, the block controller is configured to select a sub-block having a maximum value from the sub-blocks included in the next block in response to the maximum value of the next block being greater than the value of the light beam, the sampler configured to acquire fourth sampling values acquired by sampling the selected sub-block, and the light beam value determinator configured to update the value of the light beam based on the fourth sampling values.

21. A non-transitory computer-readable storage medium having stored therein program instructions, which, when executed by a computer, cause the computer to perform the method of claim 1.

* * * * *